(12) United States Patent
Ali et al.

(10) Patent No.: US 9,317,951 B2
(45) Date of Patent: Apr. 19, 2016

(54) ASSISTED CONVERSION OF BIOLOGICAL AND CHEMICAL PATHWAY INFORMATION TO THREE-DIMENSIONAL ANIMATIONS

(71) Applicant: Autodesk, Inc., San Rafael, CA (US)

(72) Inventors: Sam Latif Ali, Fremont, CA (US); Merry Shiyu Wang, Burlington (CA); Mark Alan Templin, San Francisco, CA (US); Christopher Jerome Andrews, Novato, CA (US)

(73) Assignee: Autodesk, Inc., San Rafael, CA (US)

( * ) Notice: Subject to any disclaimer, the term of this patent is extended or adjusted under 35 U.S.C. 154(b) by 233 days.

(21) Appl. No.: 13/827,731

(22) Filed: Mar. 14, 2013

(65) Prior Publication Data
US 2014/0267278 A1    Sep. 18, 2014

(51) Int. Cl.
*G06T 13/20*    (2011.01)
*G09B 23/24*    (2006.01)

(52) U.S. Cl.
CPC ................ *G06T 13/20* (2013.01); *G09B 23/24* (2013.01)

(58) Field of Classification Search
CPC ......... G06T 13/40; G06T 13/00; G06T 13/80; G06T 13/20; A63F 13/10
USPC .................................. 345/419–420, 473–475
See application file for complete search history.

(56) References Cited

U.S. PATENT DOCUMENTS

| | | | |
|---|---|---|---|
| 2005/0039123 A1* | 2/2005 | Kuchinsky et al. | 715/526 |
| 2006/0221081 A1* | 10/2006 | Cohen et al. | 345/473 |
| 2008/0150963 A1* | 6/2008 | Stambaugh | 345/629 |
| 2009/0070087 A1* | 3/2009 | Newman et al. | 703/11 |
| 2010/0153082 A1* | 6/2010 | Newman et al. | 703/11 |
| 2010/0321384 A1* | 12/2010 | Schooleman | 345/419 |
| 2011/0125468 A1* | 5/2011 | Fitzgerald et al. | 703/2 |

* cited by examiner

*Primary Examiner* — Todd Buttram
(74) *Attorney, Agent, or Firm* — Fish & Richardson P.C.

(57) ABSTRACT

This specification relates to computer animations, and more particularly to computer animations of biological and chemical pathways in which information defining the molecular assets, interactions and sequence of events involved in the pathway is combined with graphical information to generate a three-dimensional animation of the pathway.

38 Claims, 11 Drawing Sheets

Source: Wikimedia Commons

Source: *Clinical Science*, 2005, *109*, 135-142

Source: Wikmedia Commons

Source: Wikipathways

A.

- dimerize
- tyrosine kinase receptor

B.

C.

ASSISTED CONVERSION OF BIOLOGICAL AND CHEMICAL PATHWAY INFORMATION TO THREE-DIMENSIONAL ANIMATIONS

TECHNICAL FIELD

This specification relates to computer animations, and more particularly to computer animations of biological and chemical pathways.

BACKGROUND

Biological and chemical processes can involve a number of different molecular substances interacting to produce an overall result such as the metabolism of a substrate, transmission of a chemical signal in response to a signaling molecule, activation of an immune response to an antigen, or a catalytic process converting a substrate into a product. Such biological and chemical processes are frequently represented in the form of a biological or chemical pathway representing the sequence of events and showing how the different chemical and/or biological substances involved in the process interact.

A biological pathway shows how a series of interactions occurs between chemical and/or biological substances in a cell that can lead, for example, to a certain product or change in a cell. The effect of the biological process shown in a biological pathway can include the synthesis or assembly of new molecules (e.g., proteins), the activation or deactivation, or triggering a cellular activity such as cell movement, cell division or cell death. Biological pathways include pathways showing biochemical and chemical processes involved in metabolism, the regulation of gene expression and the transmission of biological signals.

One kind of biological pathway is a metabolic pathway. A metabolic pathway shows a series of chemical reactions occurring within a cell. In a metabolic pathway, a chemical is modified by a series of chemical reactions, typically catalyzed by enzymes, and potentially involving other substances such as minerals, vitamins, and other cofactors. Since many chemicals can be involved, metabolic pathways can be quite elaborate. In addition, numerous distinct pathways can co-exist within a cell. A metabolic pathway can include a series of biochemical reactions that are connected by their intermediate where the products of one reaction are substrates for subsequent reactions. Some of the reactions in a metabolic pathway may be reversible. In addition, some of the reactions of a metabolic pathway may be subject to regulation by products formed later in the pathway, e.g., through feedback inhibition. An example of a metabolic pathway, the pathway for the metabolism of glucose to pyruvate (glycolysis), is shown in FIG. 1.

Signal transduction pathways, also called cell signaling pathways, move a signal from a cell's exterior to its interior. Different cells are able to receive specific signals through structures on their surface, called receptors. After interacting with a receptor, the signal travels through the cell where its message is transmitted by specialized proteins that trigger a specific action in the cell. For example, a chemical signal from outside the cell might be turned into a protein signal inside the cell. In turn, that protein signal may be converted into a signal that prompts the cell to move.

Another kind of biological pathway is an immunological pathway. An immunological pathway is the sequence of steps and events that are triggered when the body responds to a foreign particle (or not foreign in the case of autoimmune disorders). An immunological pathway can include metabolic pathways and can also involve partial or whole cells or viruses in addition to smaller molecular components such as enzymes and peptides. An example of an immunological pathway, the pathway involved in cell signaling in response to tumor necrosis factor alpha (TNFα), is shown in FIG. 2.

Gene regulation pathways turn genes on and off. A gene regulation pathway is a pathway by which genes are turned on or off in response to a set of conditions such as the presence or absence of a compound.

The definitions of the different kinds of biological pathways are not exclusive and different pathways may interact. Metabolic substrates or metabolites involved in metabolic pathways may initiate or become involved in cell signaling pathways or gene regulation pathways. Signal transduction pathways can be involved in the immune response so that signal transduction pathways involved in raising an immunological response can also be considered to be immunological pathways. In addition, cell signaling pathways can also lead to activation or inactivation of gene regulation pathways such that gene regulation occurs as a result of the cell signaling process.

One kind of chemical pathway is a catalytic cycle, which shows the reaction steps involved in a chemical process involving a catalyst. Often such cycles show the conversion of a pre-catalyst to a catalyst. Since catalysts are regenerated, catalytic cycles can be written as a sequence of chemical reactions in the form of a loop. In such loops, the initial step entails binding of one or more reactants by the catalyst, and the final step is the release of the product and regeneration of the catalyst. FIG. 3 shows an example of a catalytic cycle for the Wacker process, involving the palladium-catalyzed oxidation of ethylene to form acetaldehyde.

In some cases, biological and chemical pathways can show more than one possible pathway, with more than one possible route, or alternative sequence of events, that can occur through the pathway. In a metabolic pathway, for example, a given substrate can be converted to more than one possible product. FIG. 4 shows an example of such a pathway, namely the pathway for nicotine metabolism, which shows at least four possible paths for the metabolism of nicotine.

Although biological and chemical pathways represent a way of conveying information about biological and chemical processes, the figures can be complicated and difficult to interpret, and can fail to accurately convey information about molecular interactions and factors such as molecular scale, shape and spatial crowding. A scientist's understanding of a biological or chemical pathway could be improved by providing an animation or interactive scene that shows how the different steps of the biological or chemical process occur over time, and spatially represents how the biological or chemical components involved in the chemical process interact over the course of the process.

SUMMARY

The systems and methods described in the application allow the automated translation of the information provided in a biological or chemical pathway to provide an animated depiction of the process to visually convey information about the molecular interactions involved in a biological or chemical process, including information as to how the molecular assets interact spatially and temporally. The system can allow a user to interact with and customize the animation to create an informative animation depicting the biological or chemical process.

The present disclosure provides a computer-implemented method for generating an animation of a biological or chemical pathway. The method can include obtaining pathway information that includes (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway; obtaining or generating graphical information comprising a three-dimensional graphical representation of each of the molecular assets; and generating from the pathway information and graphical information a three-dimensional animation wherein the three-dimensional representations of the molecular assets appear to interact in a sequence defined by the sequence information such that the animation provides an animated depiction of the at least two events involved in the biological or chemical pathway.

The present disclosure provides a system for generating an animation of a biological or chemical pathway. The system can include data processing apparatus programmed to perform operations that include obtaining pathway information comprising (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway; obtaining or generating graphical information comprising a three-dimensional graphical representation of each of the molecular assets; and generating from the pathway information and graphical information a three-dimensional animation wherein the three-dimensional representations of the molecular assets appear to interact in a sequence defined by the sequence information such that the animation provides an animated depiction of the at least two events involved in the biological or chemical pathway.

The disclosure also provides a computer-readable medium having program instructions stored thereon that, when executed by data processing apparatus, cause the data processing apparatus to perform operations that include obtaining pathway information comprising (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway; obtaining or generating graphical information comprising a three-dimensional graphical representation of each of the molecular assets; and generating from the pathway information and graphical information a three-dimensional animation wherein the three-dimensional representations of the molecular assets appear to interact in a sequence defined by the sequence information such that the animation provides an animated depiction of the at least two events involved in the biological or chemical pathway.

The graphical information can include a definition of a binding site for each molecular asset involved in a binding interaction, and wherein the three-dimensional animation is generated such that the three-dimensional representations of the molecular assets appear to interact at the binding sites.

The pathway information can include information defining at least one binding event, and at least one dissociation event.

The pathway information can include information defining at least two binding events, or at least two dissociation events, or at least two binding events and at least two dissociation events.

The pathway information can be retrieved from a database.

The pathway information can be generated by a user using a graphical user interface which is configured to allow users to enter information comprising information defining molecular assets, information defining molecular interactions between the molecular assets, and sequence information defining an order of events.

The pathway information can include identification information identifying one or more of the molecular assets involved in the biological or chemical pathway.

The graphical representations can be retrieved from a chemical or protein structure database retrieved using information identifying at least one of the molecular assets involved in the biological or chemical pathway.

The biological or chemical pathway to be animated can include more than one path representing alternative possible sequences of events in the pathway, and wherein the pathway information used to generate the animation is selected to define only one of the possible alternative sequences of events in the pathway.

Visual effect information associated with the pathway information can be obtained, wherein the visual effect information defines one or more visual effects to be displayed in the animation depicting the biological or chemical pathway, and wherein the animation is generated so as to display the one or more visual effects associated with the pathway information.

A representation of the animation, or a portion thereof, can be displayed in a graphical user interface, which is configured to allow users to view or edit the animation, or both.

A two-dimensional or three-dimensional movie can be generated from the animation.

An interactive scene for a three-dimensional player can be generated from the animation.

The pathway can be a biological pathway and wherein at least one of the molecular assets involved in the pathway is a protein.

The details of one or more embodiments are set forth in the accompanying drawings and the description below. Other features, objects, and advantages will be apparent from the description and drawings, and from the claims.

DETAILED DESCRIPTION

Figure 1:
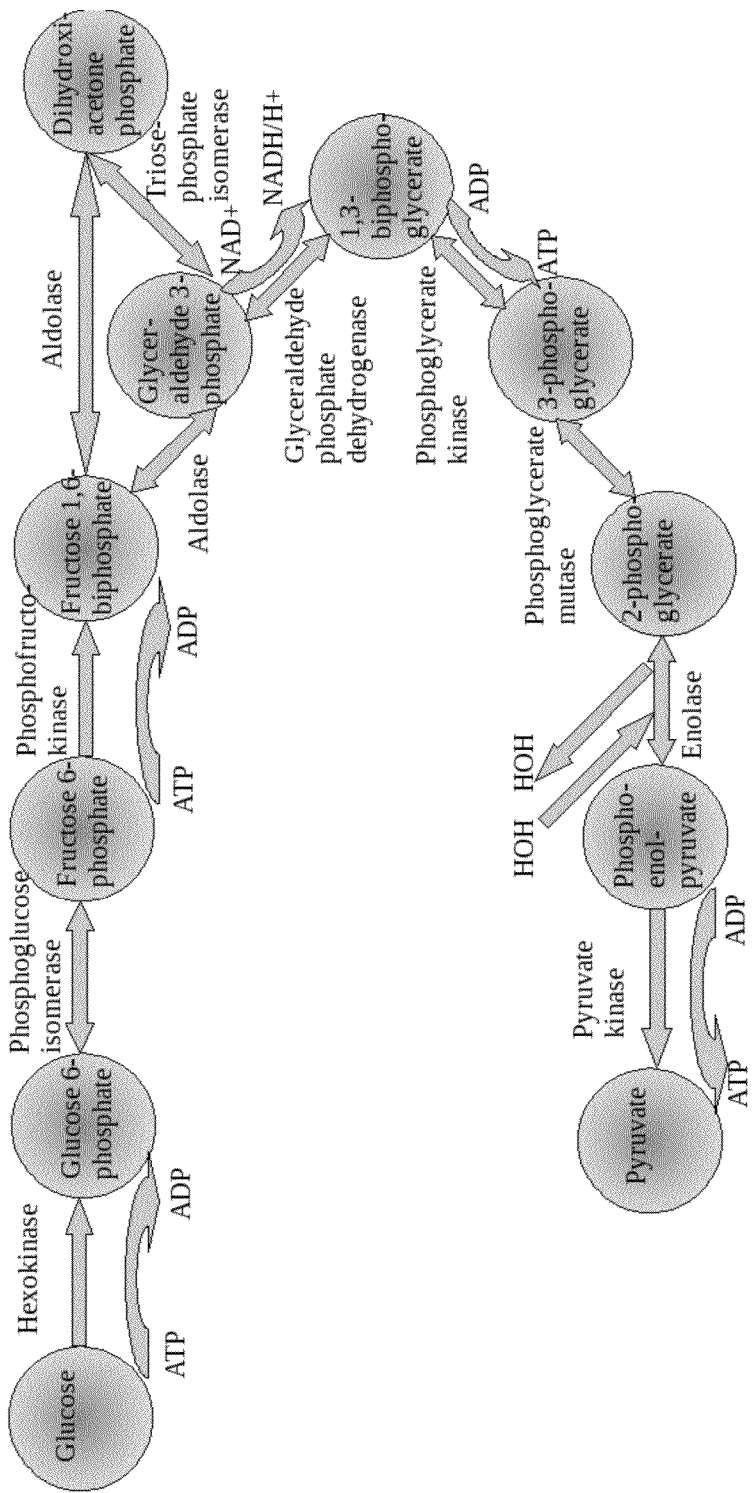
FIG. 1 shows an example of a metabolic pathway, the pathway for the metabolism of glucose to pyruvate (glycolysis).
Figure 2:
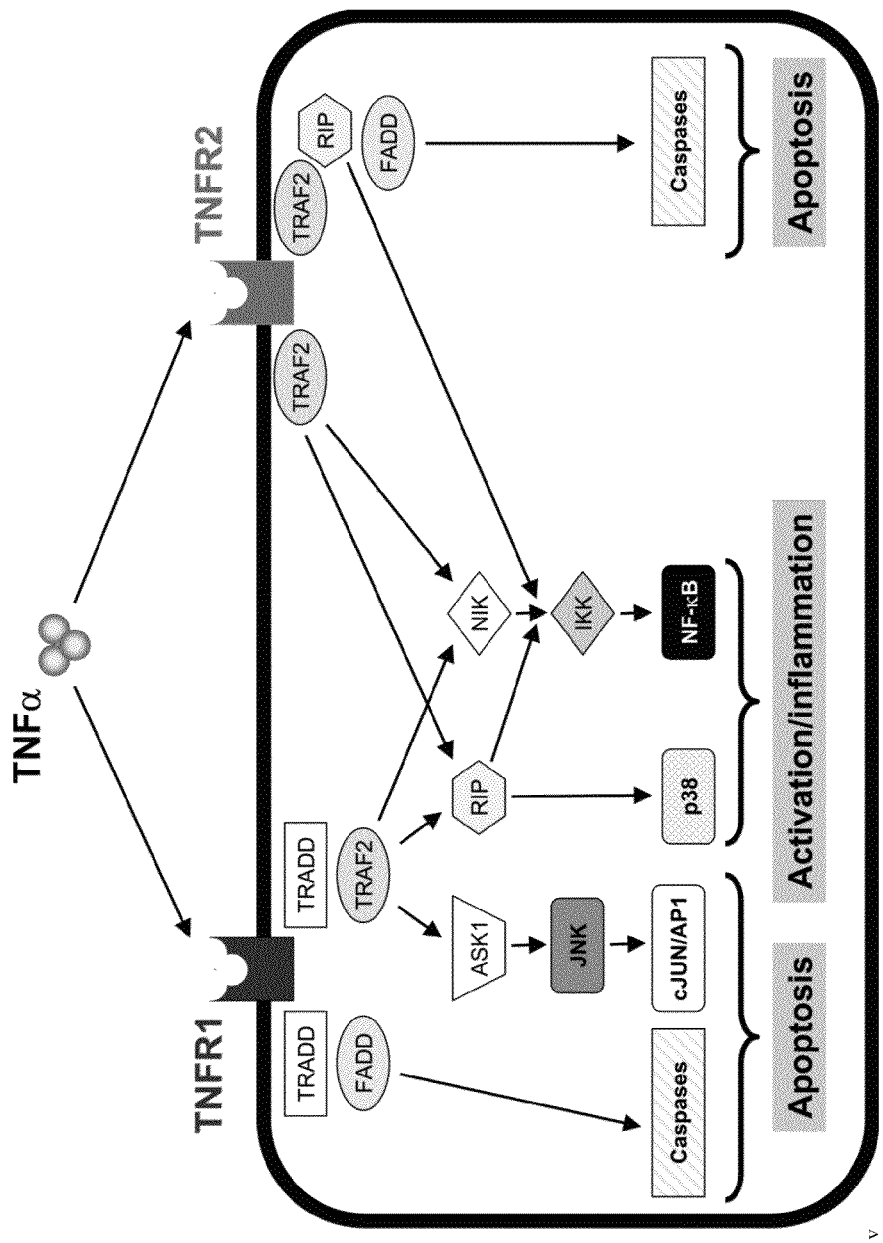
FIG. 2 shows an example of an immunological pathway, the pathway involved in cell signaling in response to tumor necrosis factor alpha (TNFα).
Figure 3:
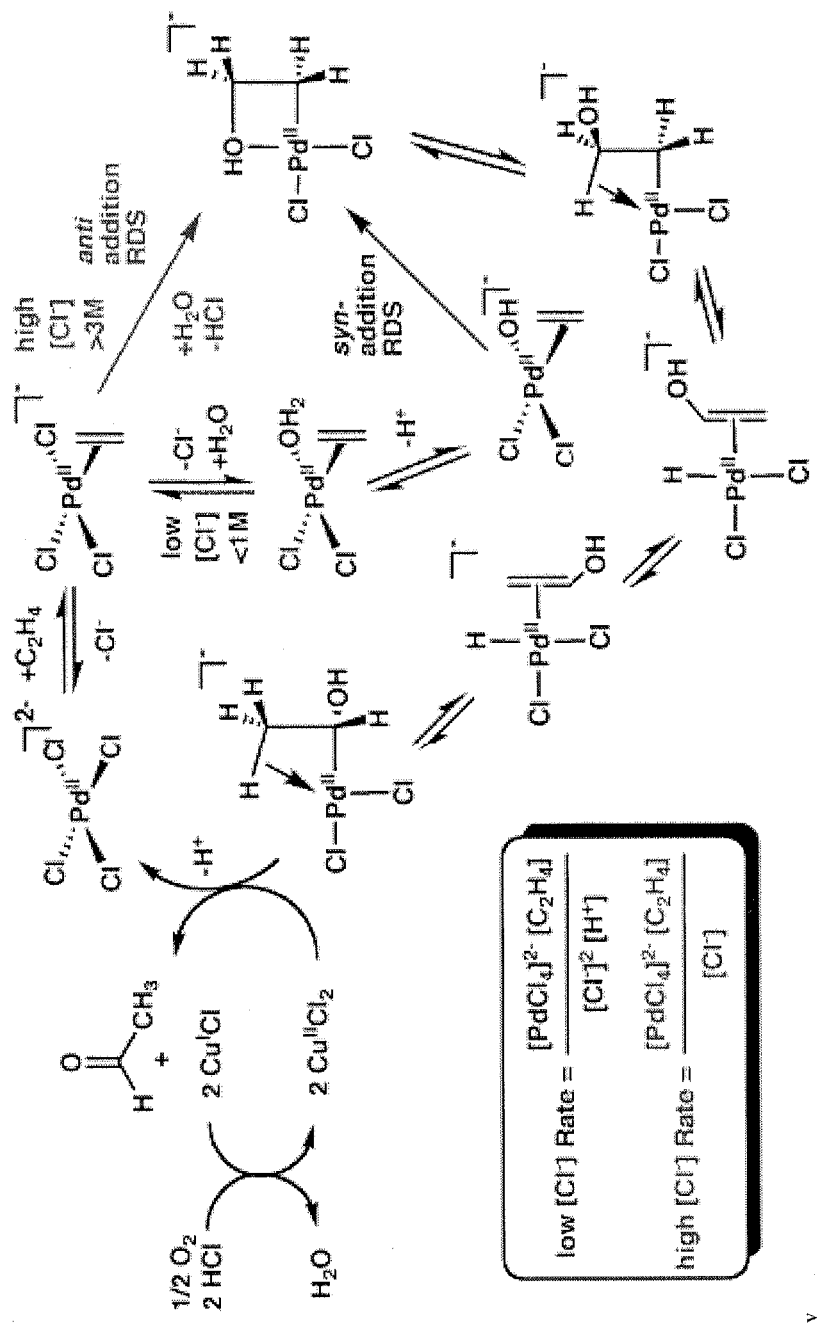
FIG. 3 shows an example of chemical pathway, the catalytic cycle for the Wacker process.
Figure 4:
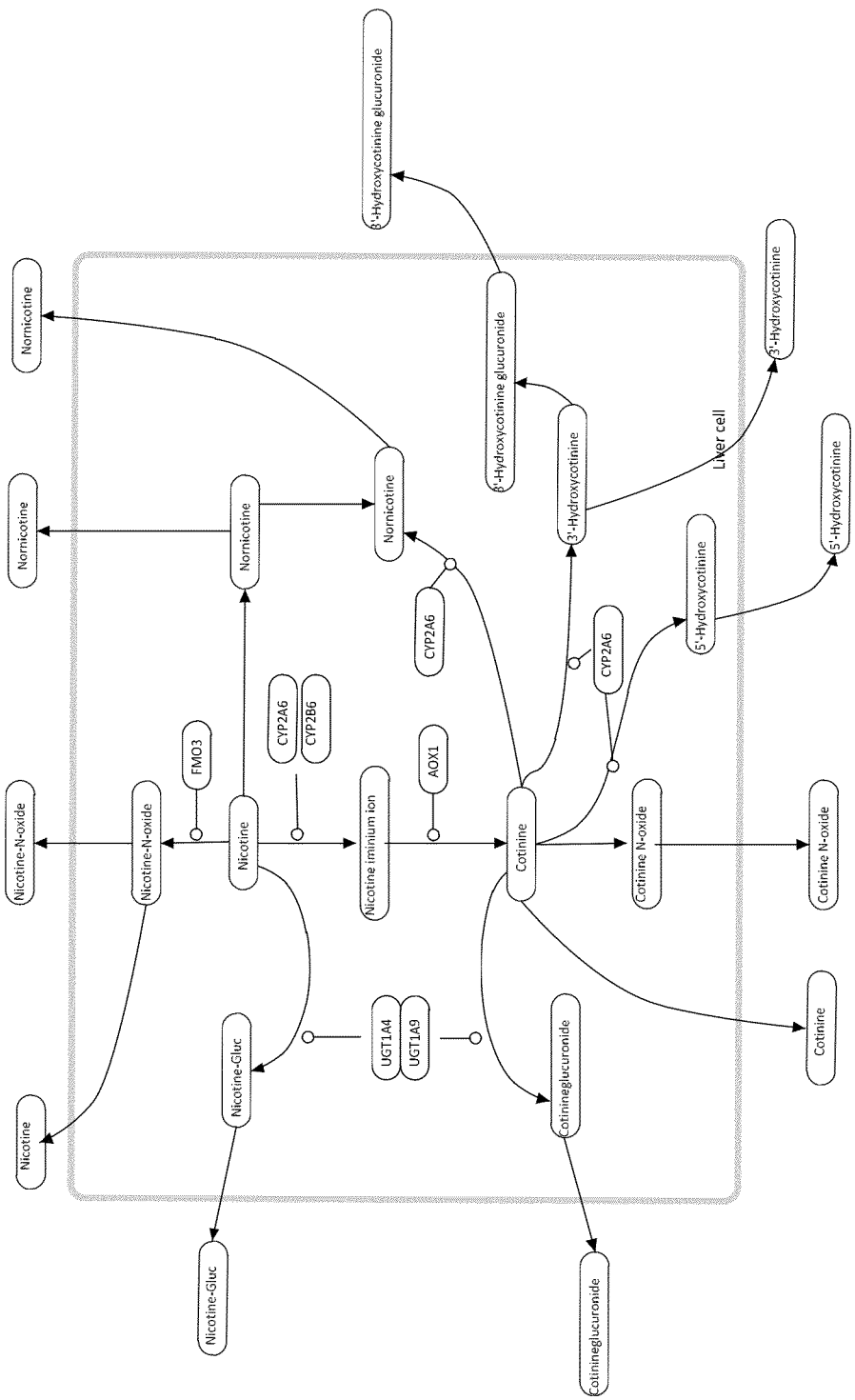
FIG. 4 shows an example of biological pathway with more than one path, the metabolic pathway for nicotine metabolism in humans.

The present disclosure relates to a system of one or more computers for providing an animated visual illustration of biological and chemical pathways by converting the information provided by a biological or chemical pathway to an animated visual depiction of the biological or chemical pathway. The system can be configured to perform particular operations or actions by virtue of having software, firmware, hardware, or a combination of them installed on the system that, in operation, causes or cause the system to perform the actions. One or more computer programs can be configured to perform particular operations or actions by virtue of including instructions that, when executed by data processing apparatus, cause the apparatus to perform the actions. The system enables molecular scientists to achieve animations and interactive scenes by starting with the standard symbols and terminology used for biological and chemical pathways and then assisting the user to create animations depicting the biological or chemical process by automating the transformation of the pathway information into an animated scene or movie.

The system is based on the concept that an immunological or metabolic pathway contains information on molecular assets such as biological components and chemical substances involved in the biological or chemical pathway and the way that those assets interact. The biological or chemical pathway also includes information as to the relative timing of the events involving the interactions of the molecular assets. Thus, a biological or chemical pathway defines a sequence of events in which the molecular assets involved in a biological or chemical pathway interact in a particular order. The biological or chemical pathway defines both the interactions which occur (i.e., which molecular assets interact with which other molecular assets in the pathway, and the nature of the interaction) as well as the order in which the events occur. Then, if three-dimensional graphical information is obtained or generated for each of the molecular assets involved in the biochemical or chemical pathway, a three-dimensional animation can be generated in which the graphical representations of the molecular assets (graphical assets) appear to interact in a sequence defined by the sequence information provided by the molecular pathway so as to provide a three-dimensional animated depiction of the biological or chemical pathway.

The system therefore uses the biological or chemical pathway as a script for generating a scene or animation, where the information on the molecular assets involved in the biological or chemical pathway and the interactions between those assets is used to construct an animation for the pathway automatically without requiring a scientist to access specialist tools for manipulating graphics. The graphical assets in the animation are caused to interact in a manner that depicts the interactions of the molecular assets involved in the biological or chemical pathway, with the order of events that is determined by the sequence information included in the biological or chemical pathway information.

To create an animation, biological or chemical pathway information is obtained as an input. The pathway represents the biological or chemical process that is to be depicted in the animation. A pathway is typically presented as a chart called a node graph or directed non-planar graph. The pathway includes information identifying the molecular assets involved in the biological or chemical process, interactions between the molecular assets, and sequence information linking the molecular assets and the interactions in a way that defines the biological or chemical pathway as a sequence of events. The pathway information can also include identification information identifying one or more of the molecular assets involved in the pathway. The identification information can include, e.g., a name or other identifier such as an identification number that is associated with the molecular asset in a database, such as a Genbank Accession Number or a Chemical Abstracts Registry number. The identification information can be used as a label or, e.g., to retrieve structural information regarding the molecular asset from a database. The pathway information can be stored in a computer memory or computer-readable medium.

The molecular assets of a biological or chemical pathway are the entities involved in the biological or chemical process that the pathway represents whose role is to be depicted in the animation. The molecular assets of a biological or chemical pathway can include reactants, products, catalysts or solvent molecules involved in a biological or chemical process. Examples of molecular assets include proteins, peptides, amino acids, nucleic acids (e.g., DNA, RNA), nucleosides, nucleotides, sugar molecules, disaccharides, oligosaccharides, polysaccharides, lipids, fats, fatty acids, enzymes, enzyme cofactors, hormones, vitamins, metabolites, antibodies, receptors, ion channels, antibodies, antigens, neurotransmitters, small molecules, drug molecules, solvent molecules (e.g., water), metabolic substrates or metabolic products. Molecular assets can also include cells or components thereof, such as blood cells, bacteria, viruses, cell membranes, etc.

The interactions between the molecular assets can include molecular interactions such as binding, chemical reaction (including forming or breaking chemical bonds, transfer of chemical groups, e.g., phosphorylation/dephosphorylation, oxidation, reduction), dimerizing, polymerizing, dissociation, conformational changes (e.g., opening, closing), and other biologically or chemically relevant molecular interactions.

The sequence information describes how the molecular assets and the interactions are linked in time in a way that conveys a sequence, order or flow of events and information, as well as resulting structural changes.

A biological or chemical pathway will typically involve a number of molecular assets and interactions. A pathway may involve two, three, four, five, six, seven, eight, nine, or ten or more molecular assets and may involve one, two, three, four, five, six, seven, eight, nine, or ten or more defined interactions between such molecular assets.

The interactions between molecular assets can include binding interactions in which one molecular asset binds with another molecular asset so as to form a complex in which the two molecular assets are bound together. A binding interaction can involve the formation of covalent bonds or non-covalent binding. When two molecular assets are involved in a binding interaction, the location of contact between the two molecular assets can be considered binding sites. A binding interaction can be depicted in an animation by bringing graphical representations of the molecular assets involved into close proximity such that they appear to bind. If it is known how the molecular assets bind together, the animation can be configured so that the graphical representations interact in a manner that depicts the interaction of the molecular assets, so that the graphical representations appear to interact at sites corresponding to binding sites of the molecular assets. Although binding interactions can involve two molecular assets binding together, binding interactions can also involve more than two molecular assets binding together to form a complex. A biological or chemical pathway can involve one, two, three, four, five, six, seven, eight, nine, or ten or more binding interactions, or one, two, three, four, five, six, seven, eight, nine, or ten or more events involving binding interactions between molecular assets.

The interactions between molecular assets can also include dissociation interactions in which a complex formed by the binding of two or more molecular assets breaks apart, or when one molecular asset breaks apart to form two or more new molecular assets. A dissociation interaction is therefore the opposite of a binding interaction, and can be regarded as a binding interaction in reverse. A biological or chemical pathway can involve one, two, three, four, five, six, seven, eight, nine, or ten or more dissociation interactions, or one, two, three, four, five, six, seven, eight, nine, or ten or more events involving dissociation interactions between molecular assets.

A biological pathway may involve at least one molecular asset that is a protein, e.g., an enzyme or a receptor.

The pathway can be a metabolic pathway that depicts a series of chemical reactions in which one or more metabolic substrates is converted via a series of reactions to one or more metabolic products. The pathway can be a signaling pathway or signaling transduction pathway that depicts a series of molecular interactions that occur when a signaling molecule from the exterior of a cell, such as a neurotransmitter, activates a response within a cell. The pathway can also be an immunological pathway depicting a sequence of steps and events that are triggered when the body responds to a foreign particle. A pathway can also be a gene regulation pathway depicting the mechanism by which genes are turned on or off in response to a stimulus.

In some implementations, the system for generating an animation allows the pathway information to be imported in a standardized format, for example, from a database. A standardized format is a format that allows the system to identify the molecular assets involved in the pathway, the molecular interactions involved in the pathway, and the sequence information. The system can include instructions for obtaining pathway information from pathways stored in a variety of formats. In some implementations, a system or program for carrying out the claimed system allows for a user to input the pathway information, such as via a graphical user interface. The pathway information can be generated by a user using a graphical interface that provides for a user to enter information that includes information defining molecular assets, information defining molecular interactions between molecular assets, and sequence information defining an order of events. For example, the user can be provided with tools to create a node-based representation of a biological pathway and provide information identifying the molecular assets involved, the interactions involved in the biological or chemical pathway, and the order of events. The pathway information, whether imported or entered by a user, can be analyzed or validated to ensure that the pathway includes all the information needed to generate an animation of the pathway and the user can be prompted to provide missing information.

In addition to obtaining information regarding the pathway, the system can obtain visual effect information associated with the pathway information. The visual effect information can define one or more visual effects that are to be displayed in the animation depicting the biological or chemical pathway. The visual effects can be associated, e.g., with events in the biological or chemical pathway. The visual effect information can be defined by a user, such as via a graphical user interface such as a graphical user interface used to enter the pathway information. The animation can be generated so as to display the one or more visual effects associated with the pathway information. A visual effect can include, e.g., types of motion of the molecular assets (e.g., molecular rotations, the type of motion by which assets are brought together or apart) or effects such as color changes or brightness changes upon binding of a molecule to a receptor to indicate activation of the receptor, or color changes to indicate activation through phosphorylation in processes involving kinases and/or phosphatases. The visual effect information can be stored in a computer memory or computer-readable medium.

The animation can also include sound that accompanies the visual animation. In addition to obtaining information regarding the pathway, the system can obtain sound effect information associated with the pathway information. The sound effect information can define one or more sound effects that are to be played when a particular molecular interaction is depicted in the animation.

Once the pathway information has been obtained, the system obtains or generates graphical information that is to be used to represent the molecular assets involved in the biological or chemical pathway in the animation. The graphical information can be stored in a computer memory or computer-readable medium.

For each of the molecular assets involved in a biological or chemical pathway, whose role is to be depicted in the animation, a three-dimensional graphical representation is used to represent the molecular asset in the animation. The graphical representation of each molecular asset can be obtained or generated in a number of ways. The graphical representations can be stored in a computer memory or a computer-readable medium.

If the structure of the molecular asset is known, information identifying the molecular asset such as a name or public database identifier can be used to locate publicly known geometric structures, from which graphics representing the structure can be generated. Examples of sources of publicly available structural information for proteins include the Worldwide Protein Databank, the Jena Library of Biological Macromolecules, the ModBase database of comparative protein structure models, and the NCI Molecular Modelling Database. Examples of sources of publicly available information for small molecules include the ChemSpider database, the Cambridge Structural Database, and the PubChem database.

A graphical representation of the molecular asset can also be obtained by employing one or more standard shapes for particular types of assets such as using a sphere to represent a virus, bacterium, or a cell, a complex, multi-primitive shape to represent a protein, or a generic Y shape to represent an antibody.

A graphical representation of the molecular asset can also be assigned though input from a user. For example, a user can be presented with an interface to set graphics that represent molecular assets. The options that can be offered can include known structures of the molecular assets, or standardized structures to represent particular types of molecular asset and drawing tools can also be provided. In addition, a user can be offered an opportunity to input graphical representations of one or more of the molecular assets which has been created using specialized software such as molecular modeling or protein modeling software. The graphical representation can be defined by a user, such as via a graphical user interface such as a graphical user interface used to enter the pathway information and visual effect information. A user can be provided with options as to how to obtain the graphical representation, such as the option to search one or more databases for a suitable graphical representation, to import a graphical representation from a file, or to access drawing tools to create or edit a graphical representation. A user can also be provided with tools to edit a graphical representation, to define interaction points, or to define how graphical representations will appear to interact in the animation.

Given a pathway with molecular assets and interactions between the assets defined, once graphical information is assigned to each molecular asset whose role in the pathway is to be depicted, an animation is generated in which the graphical representation of the molecular assets appear to interact in a sequence defined by the sequence information included in the pathway such that the animation provides an animated depiction of the biological or chemical pathway. The animation can be stored in a computer memory or computer-readable medium.

To generate the animation from the sequence information, certain default parameters can be applied to the molecular assets and interactions in the animation. Default parameters that can be applied include parameters defining: the total duration of the whole scene or animation as a whole; the duration of individual steps or phases within the animation; and the types of motion to be depicted when molecular assets are brought together or separate in an interaction. A user can be allowed to configure the default parameters used for the animation as a whole and/or to define particular parameters to be applied to particular steps or phases within the animation, or to particular molecular assets, or to interactions between the molecular assets.

The types of motion that can be depicted in the animation include: direct travel, pseudo-Brownian motion, rotation while in motion, or progressive easing. In direct travel, the assets in the animation travel along a linear or curved path. In pseudo-Brownian motion, the assets in the animation travel along a path that resembles a random path. The molecular assets can also be depicted as rotating, e.g., with constant or random rotation, while in motion.

When molecular assets interact in a biological or chemical pathway, the molecular assets may be brought together in a particular manner. For example, a molecule may bind to a particular site of a receptor. Such an interaction can be represented in the animation by bringing the graphical representations of the molecular assets into close proximity such that they appear to interact. For each molecular asset involved in such an interaction, and for each molecular interaction, an interaction site can be defined for each of the graphical representations associated with each molecular asset that is involved in the interaction being depicted. The interaction sites can be assigned to correspond to binding sites of the particular molecular assets, if such information is known, and a user can be allowed to define the interaction sites. When interaction sites are defined, the animation can be generated such that the graphical representations of the molecular assets appear to interact at the defined binding sites.

A user can also be allowed to configure effects to be displayed when particular molecular interaction involved in the pathway occurs. For example, the user can configure such effects as color changes or brightness changes upon binding of a molecule to a receptor to indicate activation of the receptor. A user can also define a particular sound to be played when a specific molecular interaction occurs.

To allow the user to interact with the animation once created from the pathway, a representation of the animation, or part of the animation, can be presented to the user in a graphical user interface. For example, the animation can be presented to the user in the form of an interactive scene graph which displays a graphical representation of the molecular assets and motions that will be displayed in the animation. The scene graph can be a graphical user interface and the user can be provided with tools to manipulate the motions and other effects to be depicted in the animation. Parameters for the animation such as motion paths can then be recalculated based on user input. A graphical user interface can allow a user to view or edit the animation, or both.

If a biological or chemical pathway has multiple routes, a user can be presented with the pathway information in a user interface and the user can be allowed to select a particular set of molecular assets and sequence of events to be depicted in the animation.

Generating an animation can include one or more of the following steps:
    (a) identifying the assets that will appear in the animation;
    (b) using the physical dimensions of the assets to calculate the extent of the animation;
    (c) calculating the relative positions of the assets in the scene based upon the events and interactions at the start, middle and end of the animation;
    (d) constraining the action within and focus of the scene to a boundary optionally specified by a user;
    (e) calculating the motions, rotations, and articulations for each asset in the animation;
    (f) applying default or authored special effects that may be triggered by particular types of events (e.g., a highlight or color change when molecules bind);
    (g) assembling a scene graph and animation information based on the assets, motion paths, and effects included in the animation; and
    (h) calculating a camera path that allows a virtual camera to track the scene activity.

A user can be allowed to customize the animation. For example, a set of animated objects can be presented to a user in an interface that can allow the user to perform one or more of the following:
    (a) playing, pausing or rewinding the movements and interactions of the assets;
    (b) playing, pausing or rewinding a calculated camera path;
    (c) modifying the camera path;
    (d) modifying motion paths, rotations, styles, or other graphical attributes of the assets;
    (e) adding annotations that can be displayed;
    (f) publishing a two-dimensional or three-dimensional movie; and
    (g) publishing an interactive scene to a 3D player.

To publish the animation as a movie, the animation can be stored in a video file format.

When a pathway is complex, a pathway can be separated into a sequence of phases representing a distinct series of interactions and events that will appear in an animation and the animation can be separated into scenes corresponding to different steps or phases of the biological or chemical pathway. Each scene represents a slice of time in which certain assets exist in a scene, corresponding to the molecular assets that participate in the phase of the biological or chemical pathway being depicted by the scene. In transitions between the scenes, assets which are to be depicted in both scenes can have an initial motion trajectory that is based on the trajectory of the asset at the end of the previous scene, and the asset's trajectory in the new scene can then be determined based on events that are depicted in the new scene. The types of events that can be used to indicate the start or end of a phase in the biological or chemical pathway:

(a) molecules bind together;
(b) molecules split;
(c) a molecule changes conformation (shape);
(d) the interaction between two molecules is blocked or activated;
(e) the appearance of new molecules in a scene;
(f) the departure of existing molecules from the scene;
(g) the start of a chain reaction [e.g., a polymerase reaction];
(h) the creation of a byproduct; and
(i) the attachment or transfer of a molecular subcomponent (e.g., phosphorylation).

In addition to depicting the molecular assets directly involved in the biological or chemical pathway, the system or a system or program for implementing the system can also provide a user with the opportunity to define background graphics and scenery objects to depict the environment in which the biological or chemical process occurs. For example, the scenery objects can include depictions of cellular components such as cell membranes, solvent molecules, cell nuclei, etc. A user can be provided with tools for drawing or defining such objects and/or be provided access menus of such objects, and tools for including such objects in a scene. A user can also be provided with tools for adding sound data for background soundtrack music and mood effects during an animation.

EXAMPLES

Example 1

Workflow for Creating an Animation of a Biological or Chemical Pathway

Figure 5:
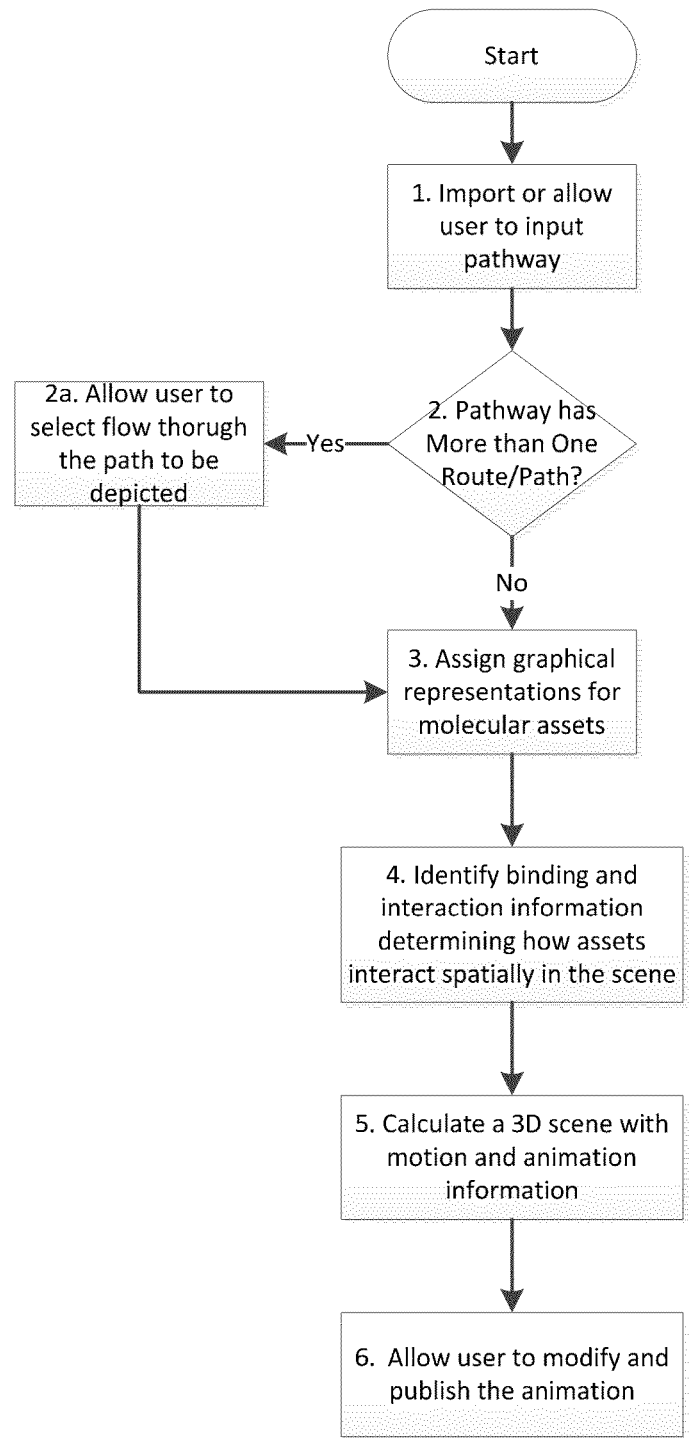
FIG. 5 is a flow diagram of an example technique to create an interactive scene for a biological or chemical pathway.

FIG. 5 is a flow diagram of an example technique for creating an interactive scene for a biological or chemical pathway. The technique can be implemented with one or more computers that are configured to execute computer software instructions to perform the steps of the technique, for example. The system imports pathway information (e.g., biological pathway information created by a user with the aid of software tools (step 1)). The imported information represents the molecular assets and interaction events that are involved in the biological or chemical pathway that is to be depicted in the animation. The system determines whether a pathway has more than one route or path (step 2). If a pathway has multiple possible routes or permutations of paths the system can receive user input to select a specific flow through the pathway that the user wishes to depict, a number of which may exist for a particular pathway (step 2a). When such a selection is made, the pathway information used to generate the animation is selected so as to define only the selected possible alternative sequences of events in the pathway. Alternatively, the system can select a specific flow randomly or generate multiple animations or animation scenes to represent the alternative routes through the path. Graphical representations are then assigned to the assets in the molecular pathway (step 3). The system can check whether cached or publicly available graphical representations exist for assets in the pathway, or the system can receive user input assigning graphics to the assets in the scene. Binding and interaction information is then used to determine how the assets may interact spatially within a scene (step 4), and the pathway information, graphical assets and interaction information is then used to construct and configure a three-dimensional scene with motion and animation information (step 5). The user can then be provided with the opportunity to modify the animation scene and publish it as a movie or an interactive experience (step 6).

A more complex technique can include one or more of the following additional steps.

During the initial configuration of the biological or chemical pathway, the system can receive user input c to set defaults on scene behaviors and representational devices such as:
(a) selecting styles of motion pathways along which assets will move (pseudo-Brownian motion, easing, linear movement, rotation);
(b) selecting visual styles of assets from palettes that can be tailored for the display of biological information including control of colors, transparency and the depiction of certain sub-structures of molecular complexes, such as water and charged markers;
(c) controlling the overall duration of the animation; and
(d) defining graphic effects such as glowing shapes, highlighting, labeling, and style and color changes for particular types of events.

After the calculation of the three-dimensional animation, a user can be provided with the ability to modify the animation, for example by:
(a) selecting alternative physical structures (conformations) for assets that can be triggered by events in the pathway;
(b) selecting background graphics and/or scene-fillers to provide context for the visualization of the biological or chemical pathway;
(c) adding annotations;
(d) adjusting the relative timing of events or adding manual playback controls such as pauses;
(e) adjusting the stylization of individual assets in the scene to allow the user to emphasize particular assets or events in the pathway; and
(f) adding additional events that can change the structure or flow of assets in the animation.

Other defaults are possible.

Example 2

Animation of a Biological Pathway

Figure 6:
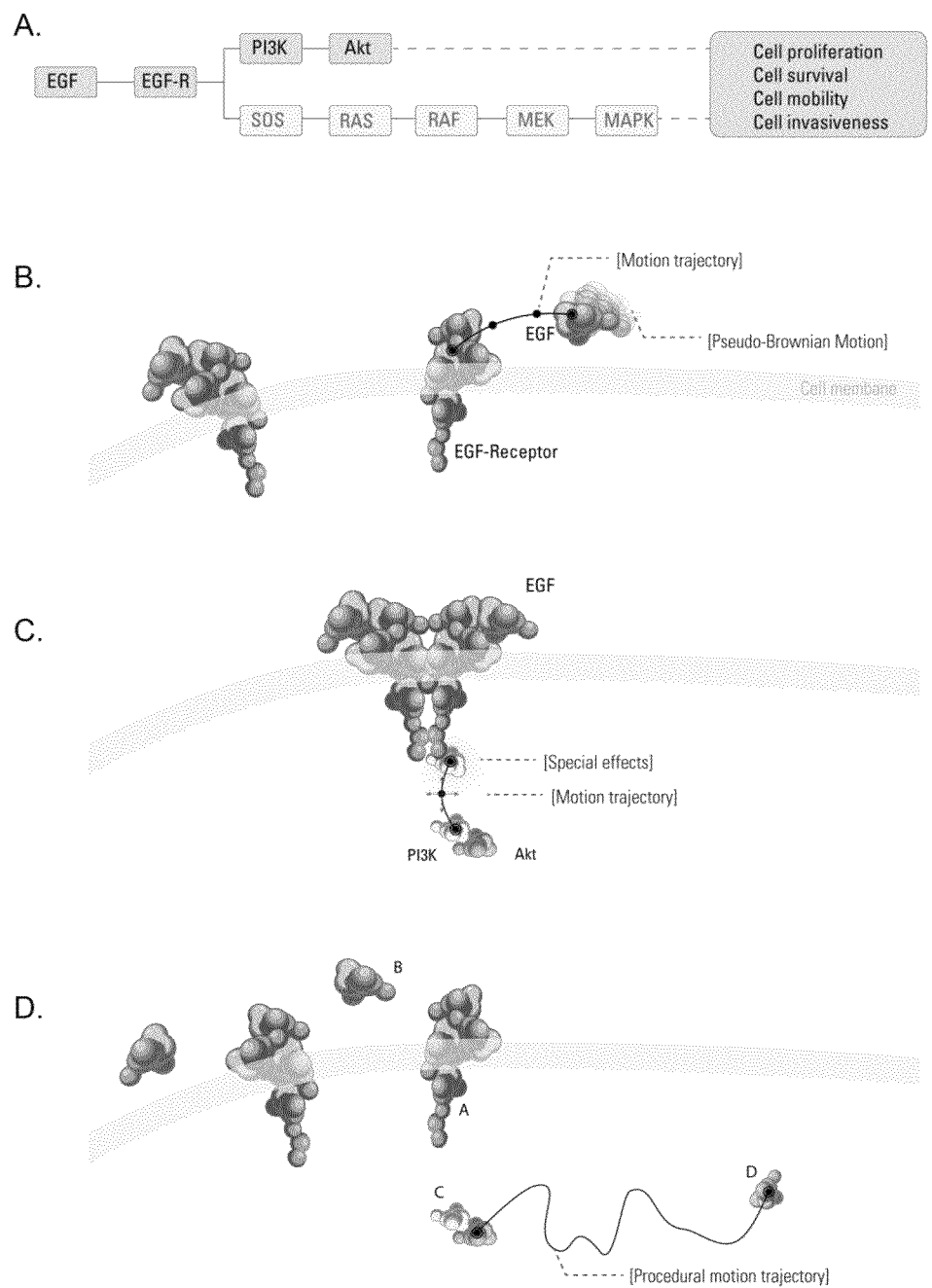
FIG. 6 shows an example of a biological pathway for epidermal growth factor (EGF), and depicts an animation of the pathway.

FIG. 6 shows an example of a biological pathway for epidermal growth factor (EGF), an important biological molecule involved in skin cancers and other diseases. FIG. 6A shows a typical depiction of the signaling pathway, which captures the sequence of assets and interactions that make up the pathway. As shown in FIG. 6A, binding of EGF to its receptor (EGFR), an event that causes dimerization of the receptor, can initiate cell signaling, including signaling via the kinases PI3K and Akt, or through the MAP kinase pathway.

FIGS. 6B-6D illustrate an indicative visual output showing how the pathway can appear in an animation. In FIG. 6B, EGF is shown binding with the EGF-R receptor protein that occurs in the membrane of a cell. FIG. 6C illustrates that in response to the binding of EGF to the receptor, the EGF/EGF-R complexes then bind together in the cell membrane, triggering a signaling reaction in which PI3K and Akt are bound and Akt is activated. FIG. 6D shows that following the signaling reaction, the complex dissociates and the pathway may be reset.

Figure 7:
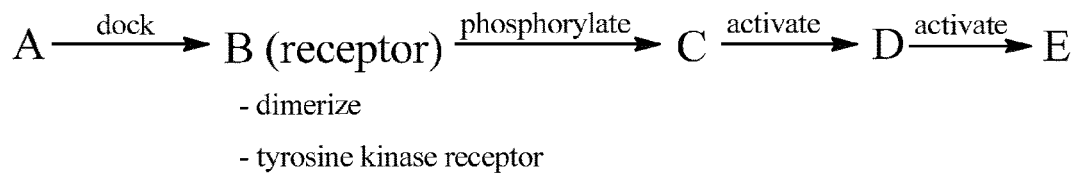
FIG. 7 shows diagrams representing the epidermal growth factor pathway.
Figure 7:
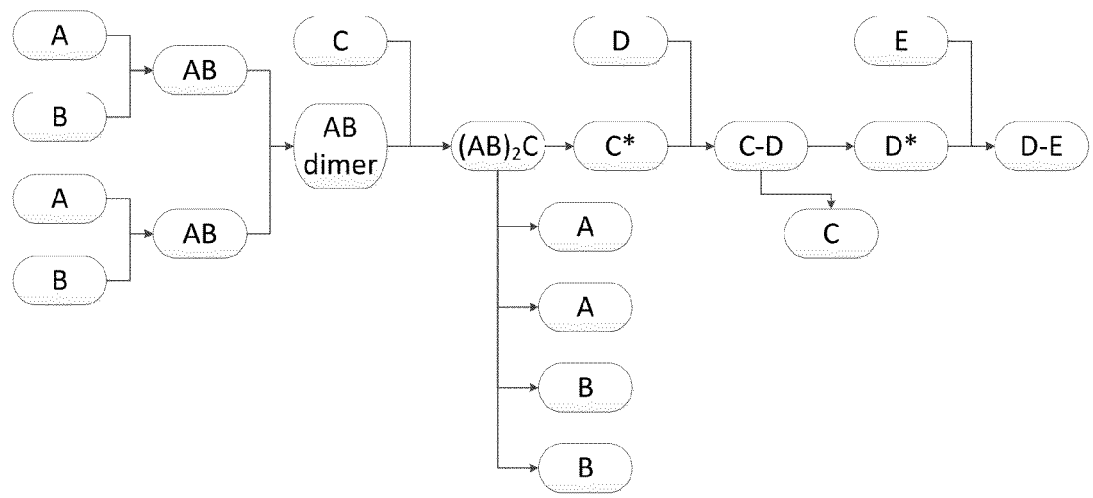
Figure 7:
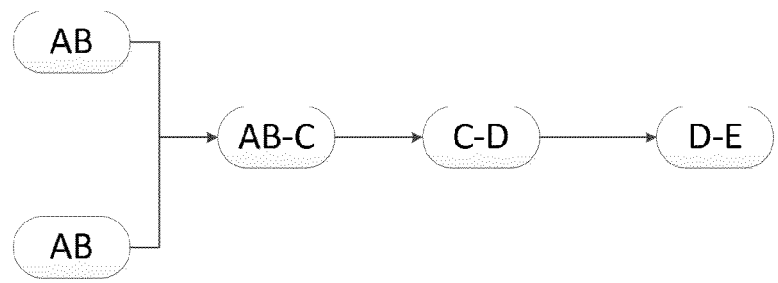

FIG. 7 illustrates how the user can enter pathway information for generating an animation of a biological or chemical pathway that is to be animated. A user defines the molecular assets that are to appear in the pathway as well as the molecular interactions that are to be depicted in the animation, including, such information as illustrated in FIG. 7A, which shows the nominal molecular substances and their high-level interaction. The system can guide the user to define the detailed interactions involved in the pathway resulting in the generation of a node-based diagram such as that shown in FIG. 7B, which shows the detailed interactions and cascade of events involved in the biological pathway. To provide a simpler graphical user interface, the graphical user interface can allow nodes of the full node-based diagram to be collapsed so as to present a simpler visual output. For example, FIG. 7C shows a collapsed version of the pathway depicted in 7C. A user can review the node-based diagram in a graphical user interface and edit the particular interactions and flow of events to be displayed, as well as assigning graphical representations to the molecular assets and assigning visual effects to events in the pathway.

Figure 8:
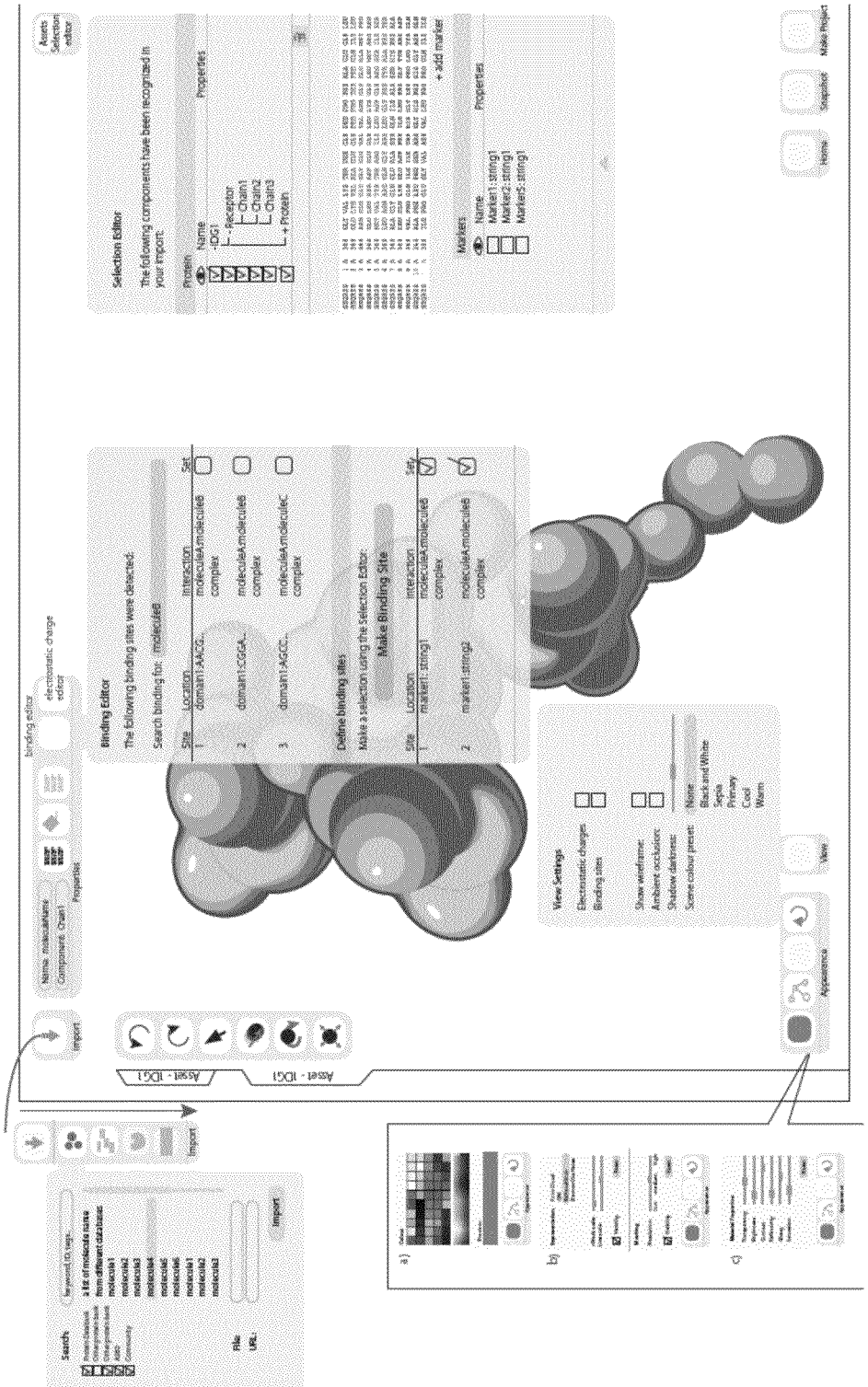
FIG. 8 illustrates an example of a graphical user interface that can be used to allow a user to interact with graphical representations of molecules involved in a pathway.

To convert the pathway information to an animation, a graphical representation is associated with each of the molecular assets involved in the biological or chemical pathway and the interaction sites are defined. FIG. 8 illustrates an example of a graphical user interface that can be used to allow the user to interact with graphical representations of the molecular assets and define interaction sites that will be used in an animation. The graphical user interface can include tools for importing graphical representations from an external source or database, viewing and rotating the graphical representations, assigning graphical characteristics such as color to the graphical representations and defining binding sites.

Once the pathway information has been defined, graphical representations have been assigned to each molecular asset that is to be depicted in the pathway, the pathway information and graphical information are combined to calculate a three-dimensional animation of the pathway. To allow the user to interact with the animation, the animation can be presented to the user in the form of an interactive scene graph that includes graphical representations of the assets involved in the biological pathway and depicts the motions that have been calculated for the animation. The scene graphs can be generated depicting the pathway as a whole, or separate phases of the pathway. The user can be provided with tools to manipulate the motions and other effects to be depicted in the animation.

Figure 9:
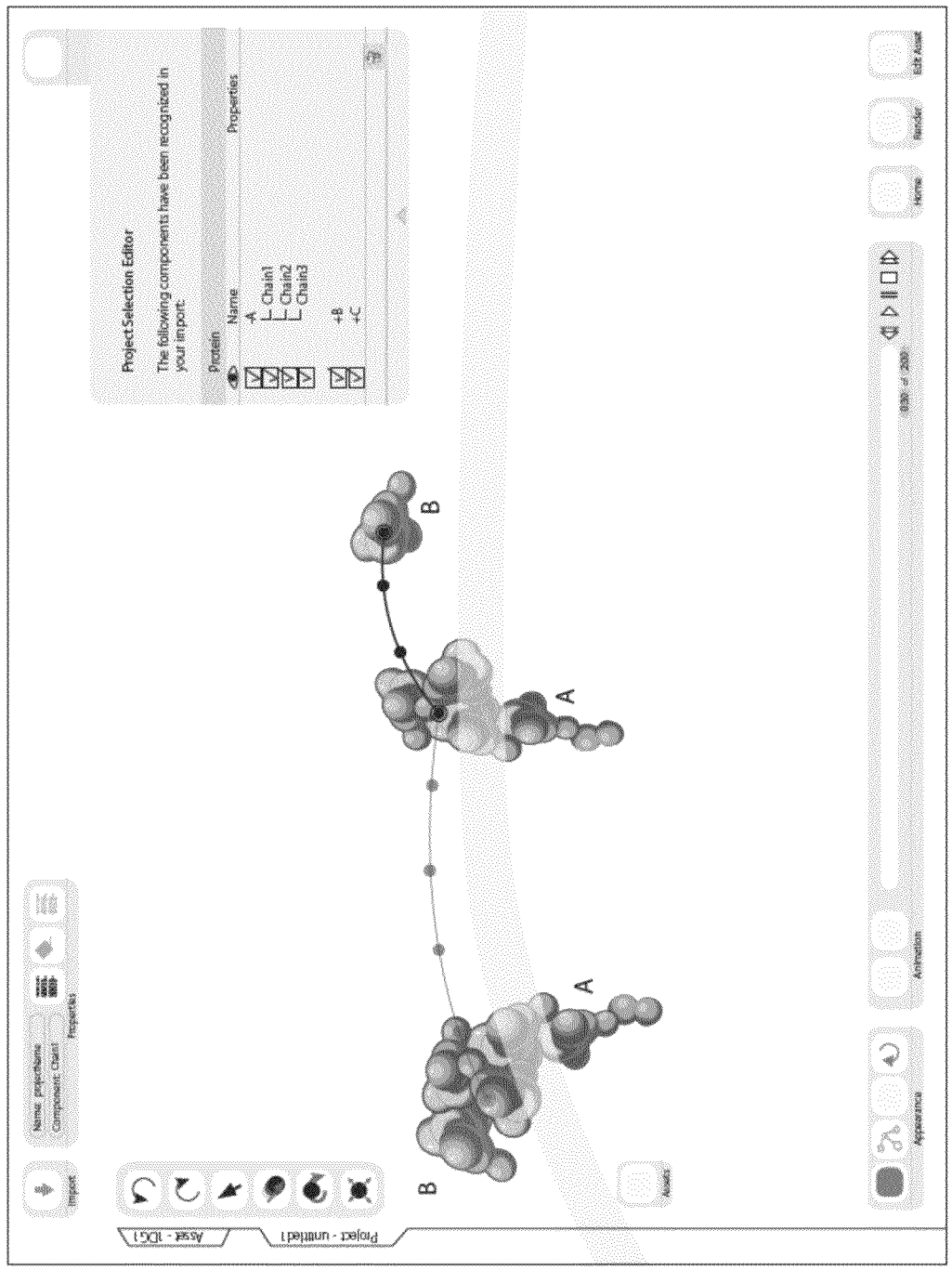
FIGS. 9-11 illustrate scene graphs depicting the animation of three phases of the EGF pathway.
Figure 10:
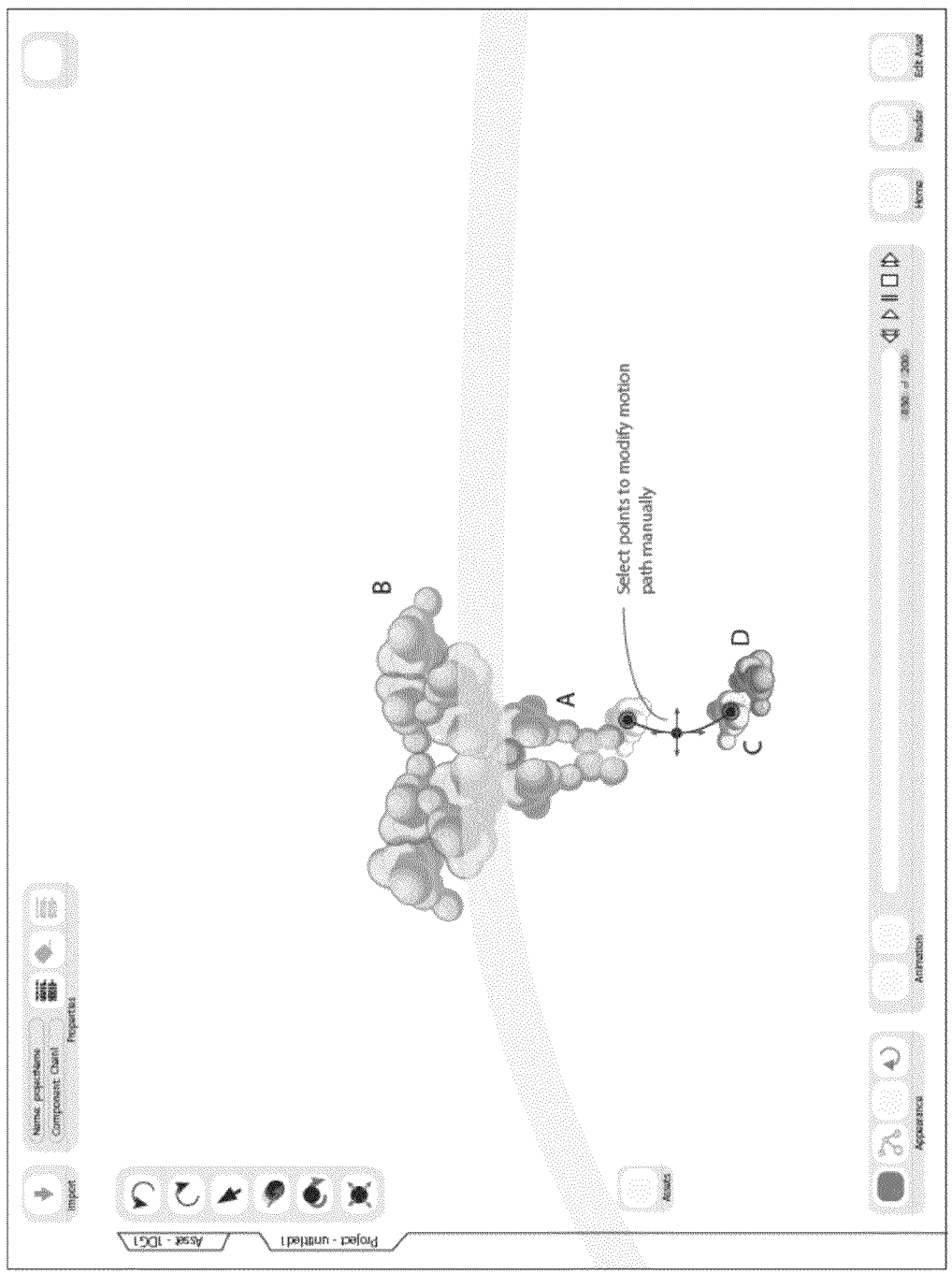
Figure 11:
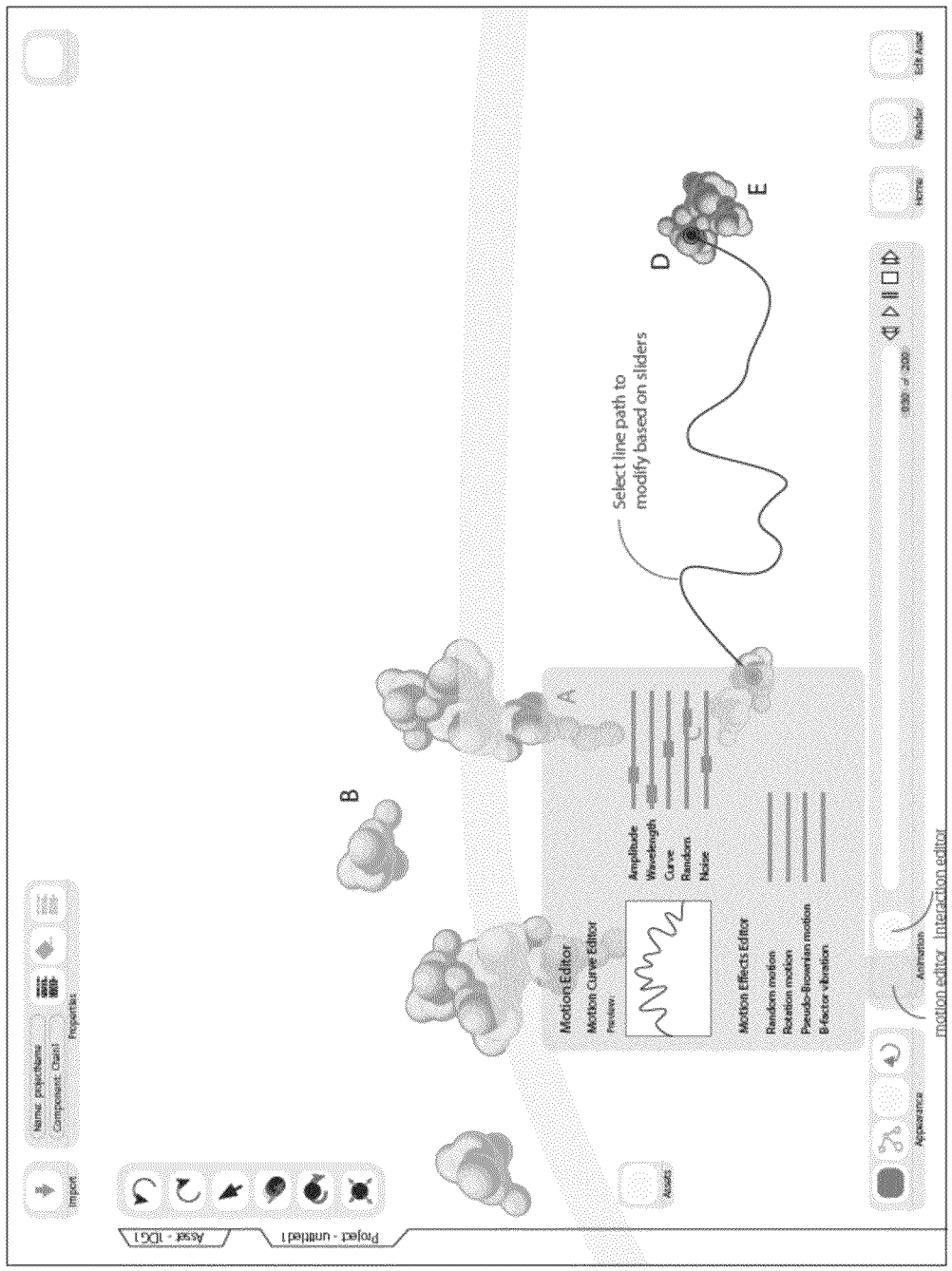

FIGS. 9-11 illustrate such scene graphs generated for three phases of the EGF pathway.

FIG. 9 is a scene graph for the animation of a first phase of the epidermal growth factor pathway in which EGF (B) binds to the EGF-R receptor (A) and the EGF-EGR-R complexes dimerize. The lines with dots indicate motion paths that will be shown in the animation bringing A together with B and then bringing the two A-B complexes together to form the dimeric $(A-B)_2$ complex. A user can be allowed interact with the scene graph to alter the motion paths (e.g., by dragging and moving the dots on the motion path lines).

FIG. 10 shows a scene graph for a later phase of the EGF pathway showing dissociation of activated PI3 kinase (C) from the EGF-EGF-R dimerized complex and binds with Akt (D). Formation of the dimeric $(A-B)_2$ complex, activates kinase activity. PI3-kinase (C) binds to the complex and is activated. In the next step (shown in this scene graph) the activated PI-3 kinase dissociates from the complex and binds to and activates Akt (D). The motion path of C from dissociation to binding with D is depicted as a line. A user can be allowed interact with the scene graph to alter the motion path (e.g., by dragging and moving the dots on the motion path lines).

FIG. 11 shows a scene graph for a phase of the EGF pathway showing dissociation of activated Akt (D) from the complex with PI3 kinase binds with a further kinase mTOR (E), and also shows dissociation of the EGF-EGF-R complex. Again, the motion of D from dissociation of the C-D complex to bind with E is depicted by a line. The figure depicts that a user can be allowed to interact with the scene graph to define the type of motion to be depicted in the animation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Each reference, including without limitation all patent, patent applications, and publications, cited in the present disclosure is incorporated herein by reference in its entirety.

What is claimed is:

1. A computer-implemented method for generating an animation of molecular interactions occurring in a biological or chemical pathway, comprising:
   obtaining by a processor pathway information comprising (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway, wherein the sequence of events includes at least one molecular interaction selected from the group consisting of molecular binding, chemical reaction, dimerizing, polymerizing, molecular dissociation, and molecular conformational change;
   obtaining or generating by a processor graphical information comprising a three-dimensional graphical representation of the structure of each of the molecular assets; and
   generating by a processor from the pathway information and graphical information a three-dimensional animation of the molecular interactions occurring in the biological or chemical pathway wherein the three-dimensional graphical representations of the molecular assets appear to interact in a sequence defined by the sequence information such that the animation provides an animated depiction of the at least two events involved in the biological or chemical pathway;
   providing the generated animation or a portion thereof, for display on a display device in a graphical user interface that is configured to allow a user to view or edit the animation, or both.

2. The method of claim 1, wherein the graphical information comprises a definition of a binding site for each molecular asset involved in a binding interaction, and wherein the three-dimensional animation is generated such that the three-dimensional graphical representations of the molecular assets involved in a binding interaction appear to interact at the binding sites.

3. The method of claim 1, wherein the pathway information comprises information defining at least one binding event, and at least one dissociation event.

4. The method of claim 3, wherein the pathway information comprises information defining at least two binding events, or at least two dissociation events, or at least two binding events and at least two dissociation events.

5. The method of claim 1, wherein the pathway information is retrieved from a database.

6. The method of claim 1, wherein the pathway information is entered using a graphical user interface which is configured to allow a user to enter information comprising information defining molecular assets, information defining molecular interactions between the molecular assets, and sequence information defining an order of events.

7. The method of claim 1, wherein the pathway information comprises identification information identifying one or more of the molecular assets involved in the biological or chemical pathway.

8. The method of claim 5, wherein at least one of the graphical representations is retrieved from a chemical or protein structure database retrieved using information identifying at least one of the molecular assets involved in the biological or chemical pathway.

9. The method of claim 1, wherein the biological or chemical pathway to be animated comprises more than one path representing alternative possible sequences of events in the pathway, and wherein the pathway information used to generate the animation is selected to define only one of the possible alternative sequences of events in the pathway.

10. The method of claim 1, comprising obtaining visual effect information associated with the pathway information wherein the visual effect information defines one or more visual effects to be displayed in the animation depicting the biological or chemical pathway, and wherein the animation is generated so as to display the one or more visual effects associated with the pathway information.

11. The method of claim 1 further comprising generating a two-dimensional or three-dimensional movie from the animation.

12. The method of claim 1, wherein the pathway is a biological pathway and wherein at least one of the molecular assets involved in the pathway is a protein.

13. The method of claim 6, wherein the user is provided with tools to create a node-based representation of the biological pathway and enter the information defining the molecular assets, the molecular interactions and sequence of events.

14. The method of claim 1, wherein the pathway information is analyzed to determine whether the pathway includes all the information required to generate the animation, and the user is prompted to enter missing information.

15. The method of claim 1, wherein the graphical assigned through input from a user wherein the user is presented with an interface to set graphics that represent molecular assets.

16. The method of claim 1, wherein generating the animation comprises calculating relative positions of the molecular assets based upon events and molecular interactions occurring in the pathway at the beginning, during, and at the end of the sequence of events and calculating motions for each molecular asset depicted in the animation.

17. A system comprising:
   data processing apparatus programmed to perform operations comprising:
   obtaining pathway information comprising (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway, wherein the sequence of events includes at least one molecular interaction selected from the group consisting of molecular binding, chemical reaction, dimerizing, polymerizing, molecular dissociation, and molecular conformational change;
   obtaining or generating graphical information comprising a three-dimensional graphical representation of the structure of each of the molecular assets;
   generating from the pathway information and graphical information a three-dimensional animation of the molecular interactions occurring in the biological or chemical pathway wherein the three-dimensional graphical representations of the molecular assets appear to interact in a sequence defined by the sequence information such that the animation provides an animated depiction of the at least two events involved in the biological or chemical pathway; and providing the generated animation or a portion thereof, for display on a display device in a graphical user interface that is configured to allow a user to view or edit the animation, or both.

18. The system of claim 17, wherein the graphical information comprises a definition of a binding site for each molecular asset involved in a binding interaction, and wherein the three-dimensional animation is generated such that the three-dimensional graphical representations of the molecular assets involved in a binding interaction appear to interact at the binding sites.

19. The system of claim 17, wherein the pathway information comprises information defining at least one binding event, and at least one dissociation event.

20. The system of claim 19, wherein the pathway information comprises information defining at least two binding events, or at least two dissociation events, or at least two binding events and at least two dissociation events.

21. The system of claim 17, wherein the pathway information is retrieved from a database.

22. The system of claim 17, wherein the pathway information was entered using a graphical user interface which is configured to allow a user to enter information comprising information defining molecular assets, information defining molecular interactions between the molecular assets, and sequence information defining an order of events.

23. The system of claim 17, wherein the pathway information comprises identification information identifying one or more of the molecular assets involved in the biological or chemical pathway.

24. The system of claim 21, wherein at least one of the graphical representations is retrieved from a chemical or protein structure database retrieved using information identifying at least one of the molecular assets involved in the biological or chemical pathway.

25. The system of claim 17, wherein the biological or chemical pathway to be animated comprises more than one path representing alternative possible sequences of events in the pathway, and wherein the pathway information used to generate the animation is selected to define only one of the possible alternative sequences of events in the pathway.

26. The system of claim 17, wherein the operations further comprise obtaining visual effect information associated with the pathway information wherein the visual effect information defines one or more visual effects to be displayed in the animation depicting the biological or chemical pathway, and wherein the animation is generated so as to display the one or more visual effects associated with the pathway information.

27. The system of claim 17 wherein the operations further comprise generating a two-dimensional or three-dimensional movie from the animation.

28. The system of claim 17, wherein the pathway is a biological pathway and wherein at least one of the molecular assets involved in the pathway is a protein.

29. The system of claim 22, wherein the user is provided with tools to create a node-based representation of the biological pathway and enter the information defining the molecular assets, the molecular interactions and sequence of events.

30. The system of claim 17, wherein the pathway information is analyzed to determine whether the pathway includes all the information required to generate the animation, and the user is prompted to enter missing information.

31. The system of claim 17, wherein the graphical assigned through input from a user wherein the user is presented with an interface to set graphics that represent molecular assets.

32. The system of claim 17, wherein generating the animation comprises calculating relative positions of the molecular assets based upon events and molecular interactions occurring in the pathway at the beginning, during, and at the end of the sequence of events and calculating motions for each molecular asset depicted in the animation.

33. A non-transitory computer-readable medium having program instructions stored thereon that, when executed by data processing apparatus, cause the data processing apparatus to perform operations comprising:

obtaining pathway information comprising (1) information defining two or more molecular assets involved in a biological or chemical pathway, (2) information defining molecular interactions between at least two of the molecular assets, and (3) sequence information linking the information defining molecular assets and the information defining the molecular interactions so as to define a sequence of at least two events involved in the biological or chemical pathway, wherein the sequence of events includes at least one molecular interaction selected from the group consisting of molecular binding, chemical reaction, dimerizing, polymerizing, molecular dissociation, and molecular conformational change;

obtaining or generating graphical information comprising a three-dimensional graphical representation of the structure of each of the molecular assets;

generating from the pathway information and graphical information a three-dimensional animation of the molecular interactions occurring in the biological or chemical pathway wherein the three-dimensional graphical representations of the molecular assets appear to interact in a sequence defined by the sequence information such that the animation provides an animated depiction of the at least two events involved in the biological or chemical pathway; and providing the generated animation or a portion thereof, for display on a display device in a graphical user interface that is configured to allow a user to view or edit the animation, or both.

34. The non-transitory computer-readable medium of claim 33, wherein the pathway information is entered using a graphical user interface which is configured to allow a user to enter information comprising information defining molecular assets, information defining molecular interactions between the molecular assets, and sequence information defining an order of events.

35. The non-transitory computer-readable medium of claim 33, wherein the user is provided with tools to create a node-based representation of the biological pathway and enter the information defining the molecular assets, the molecular interactions and sequence of events.

36. The non-transitory computer-readable medium of claim 33, wherein the pathway information is analyzed to determine whether the pathway includes all the information required to generate the animation, and the user is prompted to enter missing information.

37. The non-transitory computer-readable medium of claim 33, wherein the graphical assigned through input from a user wherein the user is presented with an interface to set graphics that represent molecular assets.

38. The non-transitory computer-readable medium of claim 33, wherein generating the animation comprises calculating relative positions of the molecular assets based upon events and molecular interactions occurring in the pathway at the beginning, during, and at the end of the sequence of events and calculating motions for each molecular asset depicted in the animation.

* * * * *